United States Patent [19]
Flood et al.

[11] Patent Number: 5,531,186
[45] Date of Patent: Jul. 2, 1996

[54] LITTER BOX WITH EXCREMENT REMOVING SCREEN

[76] Inventors: Eric Flood, 18313 Index St.; Richard Jarvis, 18200 Index St., both of Northridge, Calif. 91326

[21] Appl. No.: 427,350

[22] Filed: Apr. 24, 1995

[51] Int. Cl.$^6$ .......................... A01K 1/035; A01K 29/00
[52] U.S. Cl. ............................................................ 119/166
[58] Field of Search ................................... 119/165, 166, 119/167; 209/373, 374

[56] References Cited

U.S. PATENT DOCUMENTS

| | | | |
|---|---|---|---|
| 3,796,188 | 3/1974 | Bradstreet | 119/166 |
| 4,325,822 | 4/1982 | Miller | 209/374 X |
| 4,802,442 | 2/1989 | Wilson | 119/166 |
| 4,817,560 | 4/1989 | Prince et al. | 119/166 |

*Primary Examiner*—Robert P. Swiatek
*Assistant Examiner*—Yvonne Abbott
*Attorney, Agent, or Firm*—Albert O. Cota

[57] ABSTRACT

A cat litter box which has an open topped structural box (20) with a "U" shaped slot (30) on one side (24). A brush seal (32) is disposed within the box interior defining a pair of opposed seals with the bristle ends contiguously positioned in the middle of the slot. A screen grid tray (42) is located inside the box beneath granular litter material 34. In operation, the tray is lifted up by handles (44) on each end sifting the material therethrough capturing cat excrement for disposal. The tray is inserted into the slot parting the brush seal displacing the litter material until it is pushed fully into the box. A second embodiment includes a pair of mechanical cam handles (52) for levering the tray the final distance of the insertion travel into the cat litter box.

18 Claims, 2 Drawing Sheets

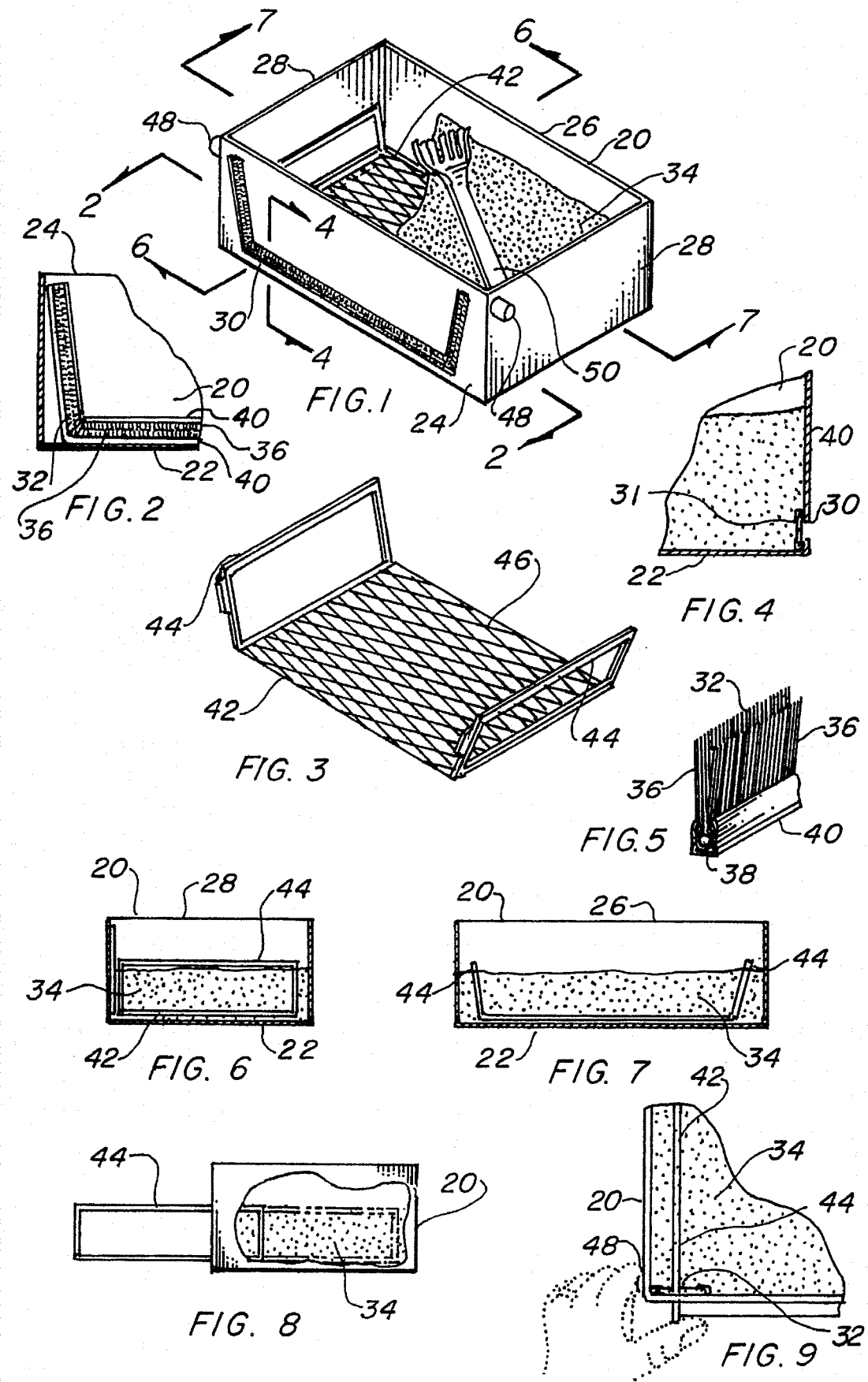

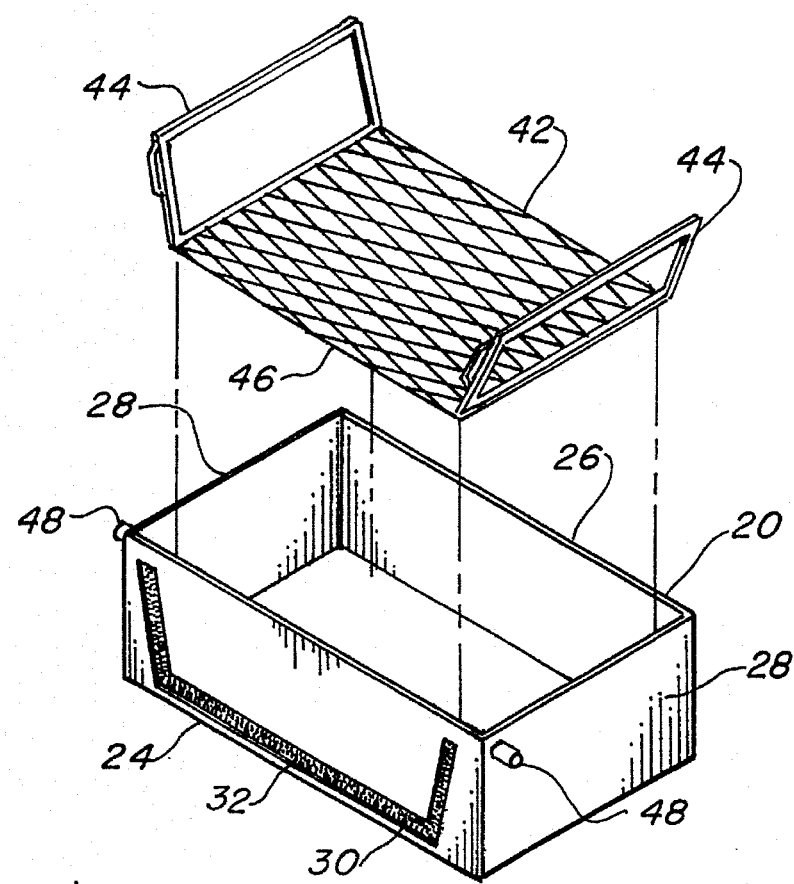
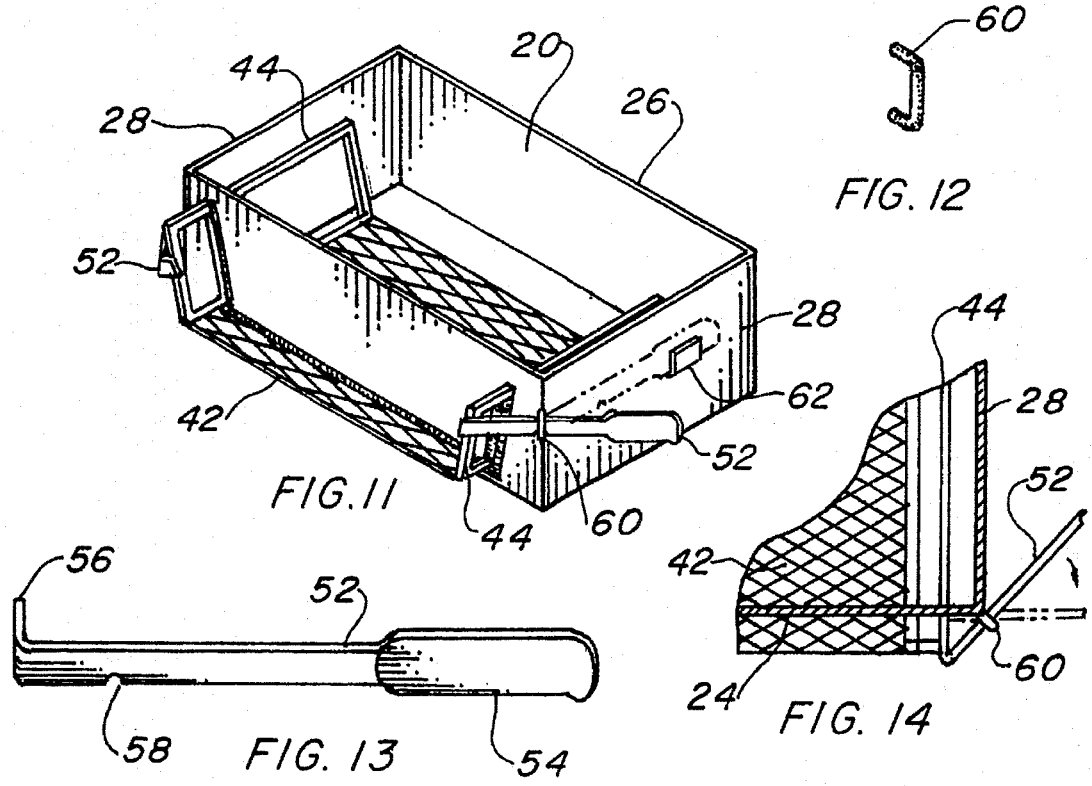

5,531,186

LITTER BOX WITH EXCREMENT REMOVING SCREEN

TECHNICAL FIELD

The invention generally pertains to cat litter boxes and more specifically to an open topped box with an insertable screen located beneath granular material permitting removal of excrement by lifting the screen through the material.

BACKGROUND ART

Most owners of indoor cats utilize a cat litter box that includes within the box, a quantity of granular material that is used to collect cat excrement. Therefore, the granular material must be frequently changed to prevent the formation of noxious odors and to maintain a hygienic environment. The task of removing the cat excrement is one the of the most unpleasant tasks that must be performed by cat owners. The removal is accomplished by scooping out as much excrement as possible in order to conserve granular material and extend its useful life.

Previously, many types of cat litter boxes have been used in endeavoring to provide an effective means for removing the cat excrement from the granular material within the box. Prior art is replete with structures utilizing enclosed boxes with lids and enclosures to allow the cat inside and to prevent the granular material from being scattered. Some prior art is directed to screens to sift the granular material by passing a screen therethrough manually or with a crank. Other designs include separation of the liquid waste matter with a method of neutralizing and storing.

A search of the prior art did not disclose any patents that read directly on the claims of the instant invention, however, the following U.S. patents are considered related:

| PATENT NO. | INVENTOR | ISSUED |
| --- | --- | --- |
| 5,303,675 | Van Den Bergh | 19 April 1994 |
| 5,259,340 | Arbogast | 9 November 1993 |
| 5,220,866 | Hyde | 22 June 1993 |
| 5,211,133 | Foley | 18 May 1993 |
| 5,184,575 | Reinartz | 9 February 1993 |
| 4,802,442 | Wilson | 7 February 1989 |
| 4,732,111 | Runion | 22 March 1988 |

Van Den Bergh in U.S. Pat. No. 5,303,675 teaches a disposable box with a lid and a scoop inside.

U.S. Pat. No. 5,259,340 of Arbogast discloses a litter box with a sifting screen that is passed through the media by the action of a crank mechanism collecting the animal waste in a storage container located on one end of the box.

Hyde's U.S. Pat. No. 5,220,866 utilizes a grate over the base of a tray to prevent scattering of cat litter out of the box.

U.S. Pat. No. 5,211,133 of Foley uses a double tray with screen in the bottom of the first tray. A liquid neutralizing agent is placed in the bottom tray permitting urine to seep through into the agent.

U.S. Pat. No. 5,184,575 issued to Reinartz includes a movable slide that can be moved longitudinally to dump debris from the floor of the box into an integral removable waste container.

Wilson discloses in U.S. Pat. No. 4,802,422 a screen, with handles, that is hand held and is passed through the litter material to collect fecal matter for disposal.

U.S. Pat. No. 4,732,111 of Runion uses a folded plastic sleeve that encloses the box after use. The sleeve automatically encloses the box when withdrawn from the housing.

For background purposes and as indicative of the art to which the invention relates reference may be made to the following remaining patents found in the search.

| PATENT NO. | INVENTOR | ISSUED |
| --- | --- | --- |
| 4,779,567 | Smith | 25 November 1988 |
| 4,724,955 | Martin, et al | 16 February 1988 |

DISCLOSURE OF THE INVENTION

Considerable effort has been directed to the problem created by pets in disposal of their waste. Cats in particular, while they may be trained to use a specific area such as a litter box, if the solid excrement is not removed within a reasonable amount of time, it may create an objectional odor. Sifting through the granular litter material is unpleasant to say the least and, not all of the excrement may be found in the same location. Therefore, it is the primary object of the invention to provide a screen grid tray that is positioned beneath the granular litter material located within a litter box. Upon lifting the tray straight up, with handles integral with the tray, the animal excrement is sifted out and easily carried to a trash receptacle. This eliminates digging through the entire tray particularly if the animal buries the excrement. Since the handles are exposed, the user is not required to handle any waste material directly. Additionally, as the tray is semi-rigid, a slight bowing at its center completely and centrally contains the waste while transporting the tray to the trash receptacle.

An important object of the invention is the ease in which the tray may be reinserted into the litter box beneath the granular litter material. A sealing means, which preferably consists of a brush seal, covers a slot on one side of the box. The seal has the exact shape of the screen grid tray therefore, it continually maintains the granular material inside the box. The tray is manually pushed into the slot displacing the granular material as it moves into place. When the tray is almost completely inserted, the last portion of the tray is pushed in by grasping a pair of side mounted gripping knobs with one's fingers and pushing the tray into place with the thumbs. In a second embodiment a pair of cam handles are provided on each side of the litter box. The handles pivot on the corner and push the last portion of the tray into the litter box.

Another object of the invention is directed to the cleanliness of the invention as no granular litter material is lost when the screen tray is removed or inserted. Also, the litter box may be handled easily when full or empty.

Still another object of the invention includes a conventional litter spoon for use when the animal waste is on the surface and easily removed.

These and other objects and advantages of the present invention will become apparent from the subsequent detailed description of the preferred and other embodiments and the appended claims taken in conjunction with the accompanying drawings.

BRIEF DESCRIPTION OF THE DRAWINGS

FIG. 1 is a partial isometric view of the preferred embodiment.

FIG. 2 is a cross-sectional view taken along the lines 2—2 of FIG. 1 illustrating the rear side of the brush seal embodiment mounted in place.

FIG. 3 is a partial isometric view of the screen grid tray completely removed from the invention for clarity.

FIG. 4 is a cross-sectional view taken along the line 4—4 of FIG. 1 illustrating a cross-section of the felt seal embodiment of the seal means.

FIG. 5 is a fragmentary partial isometric view of the seal means in the brush seal embodiment completely removed from the invention for clarity.

FIG. 6 is a cross-sectional view taken along the line 6—6 of FIG. 1 showing the tray in place.

FIG. 7 is a cross-sectional view taken along lines 7—7 of FIG. 1 showing the tray in place.

FIG. 8 is a right side elevational view of the preferred embodiment cut away to illustrate the tray insertion with the tray shown partially slid-in and fully in place in phantom.

FIG. 9 is a partial plan view of the litter box corner depicting insertion for the final distance with the fingers on the gripping handle and the thumb pushing the tray in place.

FIG. 10 is an exploded partial isometric view of the preferred embodiment with the tray shown directly above the box and no granular material in place.

FIG. 11 is a partial isometric view of the second embodiment with the cam handles rotated to the insertion position and no granular material in place.

FIG. 12 is a partial isometric view of the cam handle completely removed from the invention for clarity.

FIG. 13 is a partial isometric view of the cam pivot retainer completely removed from the invention for clarity.

FIG. 14 is a partial plan view of the second embodiment with the cam handles partially rotated ready to complete the action to the fully inserted position.

BEST MODE FOR CARRYING OUT THE INVENTION

The best mode for carrying out the invention is presented in terms of a preferred and second embodiment. Both embodiments are primarily designed alike except a mechanical lever tray insertion means, has been added in the second embodiment.

The preferred embodiment, as shown in FIGS. 1 through 14 is comprised of an open topped box 20 that includes a bottom 22, a first side 24, a second side 26 and a pair of ends 28. The box 20 may be fabricated of a metallic material such as sheet steel or aluminum. An acceptable alternate material is thermoplastic preferably injection molded such as polyproplene, polystyrene, polycarbonate, polyvinyl chloride, cellulose and the like. In any event, the box 20 is attached or integrally formed at the corners and open on the top.

The box first side 24 contains a U-shaped slot 30 adjacent to the bottom 22 and ends 28 as shown in FIGS. 1 and 10 and seal means preferably in the form of a brush seal 32, is positioned on the inside covering the slot 30 such that the granular litter material 34 is retained within the box. The brush seal 32 preferably consists of an opposed pair of strip brushes. The brushes have bristle filaments 36 locked with an anchor wire 38 into a structural channel strip 40 as shown in cross section in FIG. 4 and removed from the invention in FIG. 5. The ends of the bristles 36 touch together permitting a seal to be completed such that the material 34 will be retained inside the box 20 when it is completely filled. The bristles or individual filaments may be comprised of any suitable material such as horsehair, polyproplene, nylon or even metallic wire etc. The anchor wire 38 and channel strip 40 may be constructed of steel, aluminum, stainless steel or thermoplastic as required to be compatible with the materials of the box and its applicable attaching methods which include welding, bonding, riveting and the like. FIG. 2 depicts the seals butting together at the ends of the bristles 36 with the strips 40 on opposite sides of the slot 30.

Another embodiment of the seal means is illustrated in FIG. 4 and consists of a strip of felt 31 encased on one edge within a structural channel strip 40 attached to the box 20 as described above. In lieu of felt, other materials with similar characteristics may also be used with equal ease.

A screen grid tray 42 is configured to correspond in shape with the slot 30 including integral handles 44 which form the upper legs of the "U" channel shape. This tray 42 is depicted in FIG. 3 by itself and in the box in FIGS. 1, 6–9. FIG. 10 shows the position of the tray when it is removed directly above the box 20. The tray may be fabricated of a flattened expanded metal screen 46 with rectangular bar handles 44 welded together to form a structural body. In the thermoplastic embodiment, both the screen 46 and handles 44 may be integral and molded of the same material. In any event, the tray 42 is strong enough to be inserted into the granular material 34 without deflecting or breaking and yet may be malleable enough to bend slightly in the middle when held by the handles 44. The size and shape of the screen grid 46 may vary, however it has been found that diamond shaped openings measuring 0.500 inches×0.375 inches (1.27 cm×0.95 cm) are ideal for the application. It should be noted much smaller or slightly larger openings round, square, rectangular etc. work equally well.

A pair of gripping knobs 48 shown in FIG. 1 may be added, one on each box end, near the slot 30. The knobs are used, as illustrated in FIG. 9, to assist in the final insertion of the tray 42 providing a grip for one's fingers while pushing the tray in with the thumbs. The preferred embodiment utilizes a round bar shape welded to the side or integrally molded in the plastic configuration. The exact shape is of little importance as long as there is sufficient surface area for grasping.

For convenience a litter spoon 50, well known in the art, may be utilized in conjunction with the invention for picking up solid excrement that remains on the surface of the granular litter material. This element is obviously not necessary for complete function of either embodiment of the invention.

The second embodiment is illustrated in FIGS. 11 through 14 and is exactly the same in its basic elements and function, however, the gripping handles 44 are replaced with tray insertion means that mechanically force the tray 42 into the box through the granular material 34. This embodiment consists of a pair of cam handles 52 that are retained on each end 28 of the box 20. The handle 52 is shown by itself in FIG. 13 and includes a grip 54 on one end, an angular leg 56 on the other and a notch 58 positioned therebetween in a location permitting the handle 52 to be positioned correctly for functional operation. A pair of cam pivot retainers 60 are attached to the box 20 at the corner intersections near the slot 30. The retainers 60 loosely secure the cam handle 52 and provide a fulcrum point. Thus, allowing the handle 52 to be rotated outwardly from the box end 28 and interface with the tray handles 44 when the notch 58 is positioned within the bottom portion of the retainer 60. The rotation of the handle 52, as depicted in FIGS. 11 and 14, causes the angular leg 56 to force the tray 42 into the box 20 with a cam action thereby utilizing an increased force lever arm. A keeper 62 in the form of a channel or zee is affixed to the end 28 of the box 20 to secure each handle 52 when not in use. The retainer 60 allows the handle to be slid into position as shown in phantom in FIG. 11.

In both embodiments, the operation is the same in that the tray 42 is inserted into the slot 30 manually or partially asserted by the above insertion means. When cleaning is required, the tray 42 is lifted upward the granular material 34 is sifted through the screen 46, the excrement is disposed, and the tray 42 reinserted into the litter box 20.

While the invention has been described in complete detail and pictorially shown in the accompanying drawings it is not to be not to be limited to such details, since many changes and modifications may be made to the invention without departing from the spirit and scope thereof. Hence, it is described to cover any and all modifications and forms which may come within the language and scope of the appended claims.

We claim:

1. An animal litter box with excrement removing screen comprising:
   a) an open topped box having a bottom, a first side, a second side and a pair of ends,
   b) said first side having a U-shaped slot therethrough substantially adjacent to the bottom and corresponding ends,
   c) seal means within the box covering the slot, retaining granular litter material within the box and,
   d) a screen grid tray, having integral handles, configured to correspond in shape with the slot and insertable into the tray through the slot with capabilities of removal by lifting the handles upwardly sifting the granular litter material through the tray screen captivating excrement thereon for subsequent disposal.

2. The litter box as recited in claim 1 wherein the open topped box is fabricated of a metallic material.

3. The litter box as recited in claim 1 wherein the open topped box is fabricated of thermoplastic.

4. The litter box as recited in claim 1 wherein said seal means further comprises an opposed pair of strip brushes having bristle filaments locked with an anchor wire into a structural channel strip with bristle ends contiguous thereupon.

5. The litter box as recited in claim 1 wherein said seal means further comprises a strip of felt encased on one edge within a structural channel strip.

6. The litter box as recited in claim 1 wherein said tray further comprises flattened expanded metal screen with welded rectangular bar handles.

7. The litter box as recited in claim 1 wherein said tray further comprises injection molded thermoplastic screen and reinforced structural handles.

8. The litter box as recited in claim 1 further comprising a gripping knob on each end proximal to the slot in the box front.

9. The litter box as recited in claim 1 further comprising a litter spoon for picking up excrement that is located on top of granular material disposed within the box.

10. An animal litter box with excrement removing screen comprising:
    a) an open topped box having a bottom, a first side, a second side and a pair of ends,
    b) said first side having a U-shaped slot therethrough substantially adjacent to the bottom and corresponding end,
    c) a seal means within the box covering the slot retaining granular litter material within the box,
    d) a screen grid tray having integral handles, configured to correspond in shape with the slot and insertable into the tray through the slot with capabilities of removal by lifting the handles upwardly sifting litter granular material through the tray screen captivating excrement thereon for subsequent disposal, and
    e) tray insertion means, for mechanically forcing the tray into the box when granular litter material is present.

11. The litter box as recited in claim 10 wherein the open topped box is fabricated of a metallic material.

12. The litter box as recited in claim 10 wherein the open topped box is fabricated of thermoplastic.

13. The litter box as recited in claim 10 wherein said seal means further comprises an opposed pair of strip brushes having bristle filaments locked with an anchor wire into a structural channel strip with bristle ends contiguous thereon.

14. The litter box as recited in claim 10 wherein said seal means further comprises a strip of felt encased on one edge within a structural channel strip.

15. The litter box as recited in claim 10 wherein said tray further comprises a flatted expanded metal screen with welded rectangular bar handles.

16. The litter box as recited in claim 10 wherein said tray further comprises injection molded thermoplastic screen and reinforced structural handles.

17. The litter box as recited in claim 10 wherein said tray insertion means further comprises:
    a) a pair of cam handles contiguously retained, one upon each box end, with each cam handle having a notch on a bottom side,
    b) a pair of cam pivot retainers, attached to a corner intersection of each box end and first side, for loosely securing each cam handle and providing a fulcrum point permitting each cam handle to be rotated outwardly from the box end and interface with the tray handles when the notch is positioned in the retainer permitting a lever action to force the tray into the box when granular material is present, and
    c) a pair of keepers one affixed to each box end to secure each cam handle when not in use.

18. The litter box as recited in claim 10 further comprising a litter spoon for picking up excrement that is located on top of granular material disposed within the box.

* * * * *